United States Patent
Elqadah et al.

(10) Patent No.: US 6,893,041 B2
(45) Date of Patent: May 17, 2005

(54) AIR BAG MODULE WITH VENT COVER

(75) Inventors: Wael S. Elqadah, Gilbert, AZ (US);
David G. Magoteaux, Mesa, AZ (US);
Frank Paul Leonelli, Jr., Gilbert, AZ (US); Arnold M. Stephens, Imlay, MI (US); Robert R. Debbs, Yale, MI (US)

(73) Assignees: TRW Automotive U.S. LLC, Livonia, MI (US); TRW Vehicle Safety Systems Inc., Washington, MI (US)

( * ) Notice: Subject to any disclaimer, the term of this patent is extended or adjusted under 35 U.S.C. 154(b) by 167 days.

(21) Appl. No.: 10/438,655

(22) Filed: May 15, 2003

(65) Prior Publication Data

US 2003/0193177 A1 Oct. 16, 2003

Related U.S. Application Data

(63) Continuation-in-part of application No. 09/976,822, filed on Oct. 12, 2001, now abandoned.

(51) Int. Cl.[7] .............................................. B60R 21/26
(52) U.S. Cl. .................... 280/728.2; 280/736; 280/739
(58) Field of Search .............................. 280/739, 736, 280/728.2, 740, 742

(56) References Cited

U.S. PATENT DOCUMENTS

| | | |
|---|---|---|
| 5,234,229 A | 8/1993 | Gordon |
| 5,695,214 A | 12/1997 | Faigle et al. |
| 5,799,974 A | 9/1998 | Honda |
| 5,853,192 A | 12/1998 | Sikorski et al. |
| 6,082,765 A | 7/2000 | Bowers et al. |
| 6,213,502 B1 | 4/2001 | Ryan et al. |
| 6,406,055 B1 | 6/2002 | Faigle et al. |
| 2001/0024031 A1 | 9/2001 | Ochiai |
| 2002/0089159 A1 | 7/2002 | Fischer et al. |

*Primary Examiner*—Peter C. English
(74) *Attorney, Agent, or Firm*—Tarolli, Sundheim, Covell & Tummino L.L.P.

(57) ABSTRACT

An apparatus (10) includes an inflatable device (12) for helping to protect a vehicle occupant, and an inflator (14) with inflation fluid outlets (24). A vent member (30) connected with the inflator (14) has a vent wall (60) having at least one vent opening (62). A vent cover (100) includes an outer wall (110) having first and second end portions (112 and 114). The vent cover (100) has a closed condition clamped on the vent wall (60) and covering the vent opening (62), and an open condition enabling fluid flow through the vent opening. An actuatable device (130) has an unactuated condition connecting the first and second end portions (112 and 114) to maintain the vent cover in the closed condition, and an actuated condition releasing the end portions to release the vent cover to the open condition to vent inflation fluid from the apparatus (10).

20 Claims, 7 Drawing Sheets

US 6,893,041 B2

AIR BAG MODULE WITH VENT COVER

RELATED APPLICATIONS

This application is a continuation-in-part of U.S. patent application Ser. No. 09/976,822, filed on Oct. 12, 2001, now abandoned.

BACKGROUND OF THE INVENTION

The present invention relates to a vehicle occupant protection apparatus including an inflatable vehicle occupant protection device, such as an air bag. In particular, the present invention relates to an air bag module in which inflation fluid is selectively vented from the module, and to a cover for a vent in such a module.

DESCRIPTION OF RELATED ART

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, then it may be desirable to reduce the speed and force with which the air bag inflates. It is known to vent inflation fluid from the housing of an air bag module in such circumstances, so that less inflation fluid is directed into the air bag. This venting may be accomplished by moving a member, such as a door panel, that normally covers a vent opening in the module.

SUMMARY OF THE INVENTION

The present invention relates to a vehicle occupant protection apparatus includes an inflatable device for helping to protect a vehicle occupant, and an inflator. The inflator has a plurality of inflation fluid outlets. A vent member connected with the inflator has a vent wall having at least one vent opening. A vent cover includes an outer wall having first and second end portions. The vent cover has a closed condition clamped on the vent wall and covering the vent opening, and an open condition removed at least partially from the vent wall and enabling fluid flow through the vent opening. An actuatable device has an unactuated condition connecting said first and second end portions to maintain the vent cover in the closed condition, and an actuated condition releasing said first and second end portions to release the vent cover for movement to the open condition to vent inflation fluid from the apparatus.

The present invention also relates to a vehicle occupant protection apparatus including an inflatable vehicle occupant protection device for, when inflated, helping to protect the vehicle occupant. An inflator provides inflation fluid for inflating the protection device. The inflator has a generally cylindrical configuration and has a plurality of inflation fluid outlets. A vent member connected with the inflator has an annular vent wall with at least one vent opening. A vent cover formed as a split ring has a cylindrical outer wall. The outer wall has first and second end portions. A first mounting flange is disposed on the first end portion of the outer wall. A second mounting flange is disposed on the second end portion of the outer wall. The vent cover has a closed condition clamped on the vent wall and covering the vent opening. The vent cover has an open condition removed at least partially from the vent wall and enabling fluid flow through the vent opening to vent inflation fluid from the apparatus. An actuatable device has an unactuated condition connecting the first and second mounting flanges to maintain the vent cover in the closed condition on the vent wall. The actuatable device has an actuated condition releasing the first and second mounting flanges to release the vent cover for movement from the closed condition to the open condition to enable fluid flow through the vent opening to vent inflation fluid from the apparatus.

The present invention also relates to a vehicle occupant protection apparatus including an inflatable vehicle occupant protection device for, when inflated, helping to protect the vehicle occupant. An inflator provides inflation fluid for inflating the protection device. The inflator has a plurality of inflation fluid outlets. A vent member connected with the inflator has an annular vent wall with at least one vent opening. A vent cover has a rectangular outer wall. The outer wall has first and second end portions. A first mounting flange is disposed on the first end portion of the outer wall. A second mounting flange is disposed on the second end portion of the outer wall. The vent cover has a closed condition clamped on the vent wall and covering the vent opening. The vent cover has an open condition removed at least partially from the vent wall and enabling fluid flow through the vent opening to vent inflation fluid from the apparatus. An actuatable device has an unactuated condition connecting the first and second mounting flanges to maintain the vent cover in the closed condition on the vent wall. The actuatable device has an actuated condition releasing the first and second mounting flanges to release the vent cover for movement from the closed condition to the open condition to enable fluid flow through the vent opening to vent inflation fluid from the apparatus.

The present invention also relates to a vehicle occupant protection apparatus including an inflatable vehicle occupant protection device for, when inflated, helping to protect the vehicle occupant. An inflator provides inflation fluid for inflating the protection device. The inflator has a plurality of inflation fluid outlets. A vent member connected with the inflator has a vent wall with at least one vent opening. A vent cover includes a first cover portion and a second cover portion. The first cover portion has a first end comprising a first flange portion and an opposite second end comprising a latch member. The second cover portion has a first end comprising a second flange portion and an opposite second end comprising a hook. The latch member of the first cover portion is engageable with the hook of said second cover portion to connect the second ends of the first and second cover portions. An actuatable device has an unactuated condition connecting the first and second flange portions to maintain the vent cover in a closed condition clamped onto the vent wall and blocking inflation fluid flow through the vent opening. The actuatable device has an actuated condition releasing the first and second flange portions to release the vent cover for movement from the closed condition to an open condition at least partially spaced from the vent wall to enable fluid flow through the vent opening to vent inflation fluid from the apparatus.

The present invention further relates to a vehicle occupant protection apparatus including an inflatable vehicle occupant protection device for, when inflated, helping to protect the vehicle occupant. An inflator provides inflation fluid for inflating the protection device. The inflator has a generally cylindrical configuration centered on an axis and having a plurality of inflation fluid outlets for directing inflation fluid to flow radially outward from the inflator. A reaction plate supports the inflator and the protection device on the vehicle. The reaction plate has at least one vent opening disposed radially outward of the inflation fluid outlets of the inflator. A retainer has an annular radially extending main body portion for clamping the protection device to the reaction plate. The retainer has a plurality of axially extending, circumferentially spaced clamping legs for clamping the inflator to the reaction plate at a location radially between the inflation fluid outlets of the inflator and the vent opening of the reaction plate. The spaced clamping legs define between them a plurality of circumferentially spaced fluid passages that provide fluid communication between the inflation fluid outlets of the inflator and the vent opening in said reaction plate. A vent cover has a closed condition clamped on the reaction plate and covering the vent opening. An actuatable device on the vent cover has an unactuated condition maintaining the vent cover in the closed condition clamped on the reaction plate. The actuatable device has an actuated condition releasing the vent cover for movement from the closed condition to an open condition removed at least partially from the reaction plate and enabling fluid flow through the vent opening to vent inflation fluid from the apparatus.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
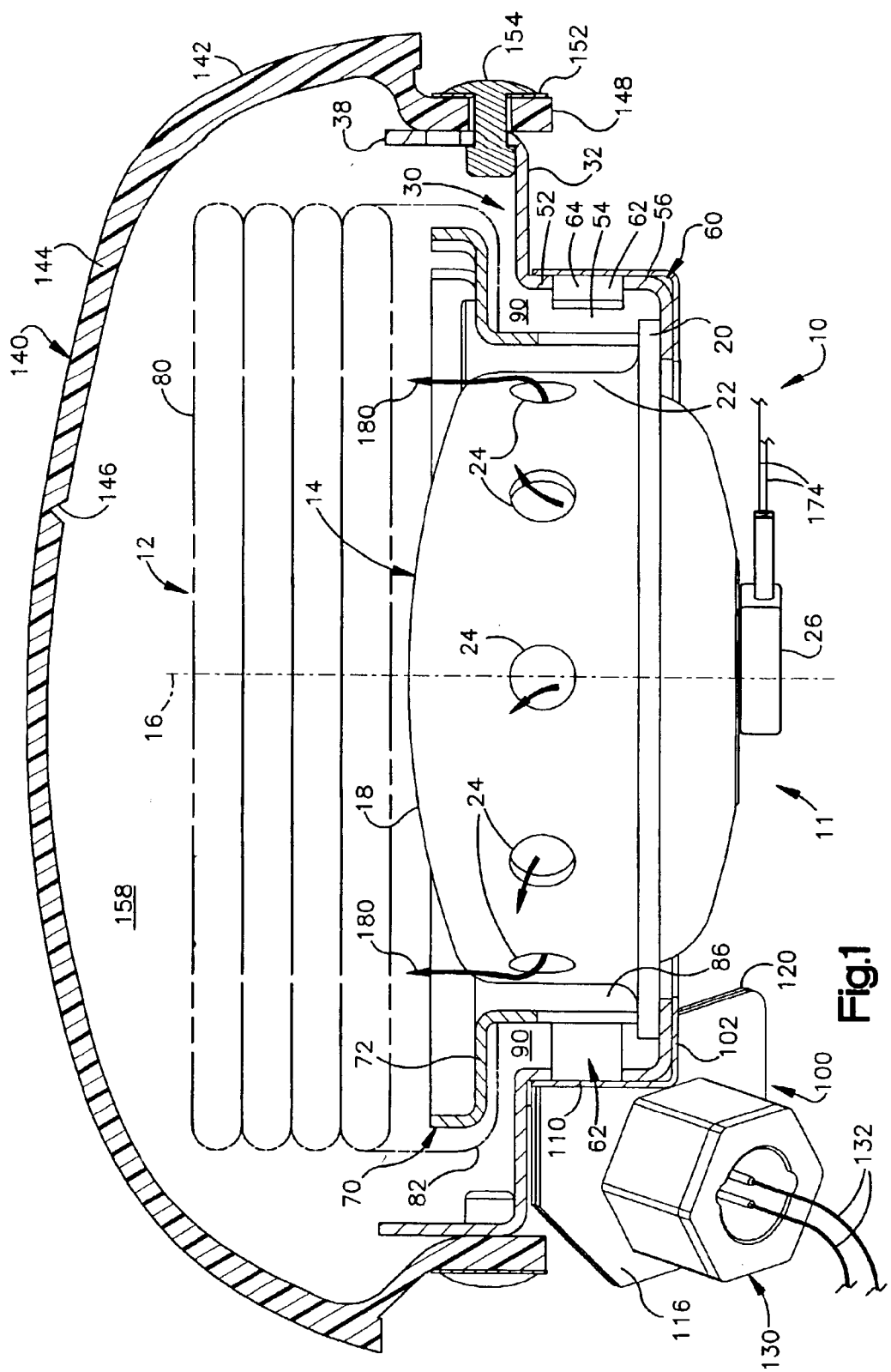
FIG. 1 is a schematic illustration, partially in section, of a vehicle occupant protection apparatus constructed in accordance with a first embodiment of the present invention, including a vent cover shown in a closed condition.

The present invention relates to a vehicle occupant protection apparatus including an inflatable vehicle occupant protection device, such as an air bag. In particular, the present invention relates to an air bag module in which inflation fluid is selectively vented from the module in order to control the pressure, speed and force of deployment of the inflating air bag. As representative of the present invention, FIGS. 1–7 illustrate a vehicle occupant protection apparatus 10 constructed in accordance with the invention.

The apparatus 10 includes an air bag module 11. The module 11 includes an inflatable vehicle occupant protection device 12 of the type commonly known as an air bag. Other occupant protection devices that can be used in accordance with the invention include, for example, inflatable knee bolsters, inflatable headliners, inflatable side curtains, knee bolsters actuatable by air bags, and seat belt pretensioners.

The module 11 also includes an inflator 14. The inflator 14 comprises a source of inflation fluid for inflating the air bag 12. As known in the art, the inflator 14 may contain an ignitable gas-generating material, which, when ignited, rapidly generates a large volume of gas. The inflator 14 may alternatively contain a stored quantity of pressurized inflation fluid, or a combination of pressurized inflation fluid and ignitable material for heating the inflation fluid.

The inflator 14 illustrated in the drawings has a cylindrical configuration centered on an axis 16. The inflator 14 could have a configuration other than the cylindrical configuration illustrated in the drawings. The inflator 14 has a main body portion 18 and an annular mounting flange 20. The main body portion 18 includes an annular side wall 22 having a plurality of inflation fluid outlets 24 through which inflation fluid is directed radially outward upon actuation of the inflator 14. The inflator 14 further includes an electrical connector 26 for receiving an electric actuation signal.

The module 11 also includes a mounting member 30. The mounting member 30 is a structure that supports the other parts of the air bag module 11 on the vehicle, and that assumes the reaction forces of the inflator and the air bag when actuated. In the illustrated embodiments, the mounting member is a reaction plate.

The reaction plate 30 has a rectangular, planar central portion 32 with a circular central opening 34 for receiving the inflator 14. Four fastener openings 36 extend through the central portion 32 of the reaction plate 30, radially outward of the central opening.

The reaction plate 30 has two cover support flanges 38 that extend upward from opposite sides of the central portion 32. Two other cover support flanges 40 extend in an opposite direction, from the other two sides of the central portion 32. The reaction plate 30 also includes two module mounting flanges 42 that are secured to the vehicle in a manner not shown, and that support the reaction plate 30 on the vehicle.

The reaction plate 30 has a vent portion 50. The vent portion 50 has a cylindrical, cage-like configuration and includes a circular upper rim 52 that depends from the central portion 32 of the reaction plate 30, centered on the axis 16. The vent portion 50 also includes a plurality of tabs 54 that extend downward from the upper rim 52 and are interconnected by a lower rim 56.

The tabs 54 are spaced apart in a circular array centered on the axis 16. The tabs 54 and the rims 52 and 56 together form a perforate, annular vent wall 60 of the reaction plate 30. The vent wall 60 has a vent opening 62 that comprises a plurality of slots 64, which are the spaces between the tabs 54.

The module 11 includes a retainer 70 that is connected with the air bag 12 and that retains, or secures, the air bag in the apparatus. The retainer 70 has a ring-shaped body portion 72 extending around the main body portion 18 of the inflator 14. The body portion 72 of the retainer 70 has a circular central opening 74.

The retainer 70 includes four support posts 76, although a different number of support posts, or a different type of structure, could be provided. The support posts 76 extend into the fastener openings 36 in the central portion 32 of the reaction plate 30. Nuts 78 screwed on the support posts 76 secure the retainer 70 to the reaction plate 30.

The air bag 12 has a main body portion 80, and a mouth portion 82 with a circular inflation fluid opening 84. The mouth portion 82 of the air bag 12 is clamped between the body portion 72 of the retainer 70 and the central portion 32 of the reaction plate 30. As a result, the air bag 12 is secured to the reaction plate 30.

The retainer 70 also has four clamp legs 86 that depend from the body portion 72. The clamp legs 86 are located at the outer periphery of the central opening 74 of the retainer 70. The clamp legs 86 are in the form of rigid tabs that are spaced apart in a circular array about the axis 16.

The clamp legs 86 engage the mounting flange 20 of the inflator 14 and press it axially against the lower rim 56 of the vent portion 50 of the reaction plate 30. As a result, the mounting flange 20 of the inflator 14 is clamped between the retainer 70 and the reaction plate 30. The inflator 14 is thus secured in the module 11, with the air bag 12 and the retainer 70, on the reaction plate 30.

When the inflator 14 is secured on the reaction plate 30, the vent wall 60 of the reaction plate is located radially outward of the side wall 22 of the inflator. An annular plenum chamber 90 is defined radially outward of the inflator side wall 22 and radially inward of the reaction plate vent wall 60. The clamp legs 86 of the retainer 70 extend through the plenum chamber 90.

The module 11 includes a vent cover 100. The vent cover 100 is a structure that covers the vent opening 62 in the vent wall 60 of the reaction plate 30 when the inflator 14 is unactuated. The vent cover 100 is selectively removable from the reaction plate 30, in a manner described below, to enable venting of inflation fluid from the module 11.

Figure 4:
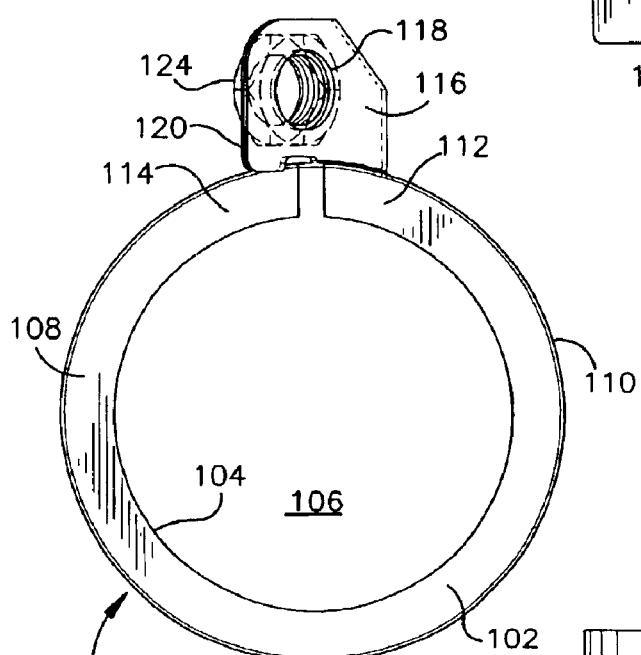
FIG. 4 is a bottom plan view of the vent cover of FIG. 1.
Figure 5:
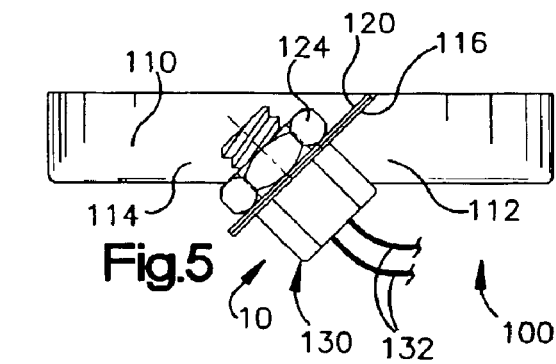
FIG. 5 is a side elevational view of the vent cover of FIG. 1, including an actuatable fastener shown in an unactuated condition.
Figure 6:
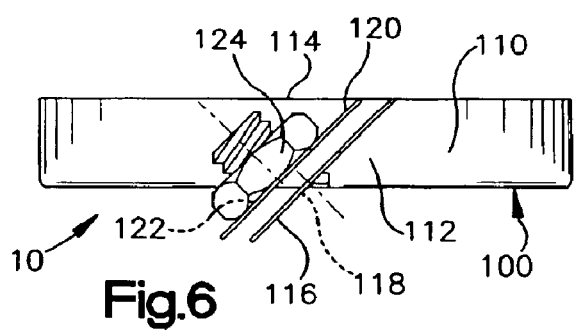
FIG. 6 is a view similar to FIG. 5 showing the actuatable fastener in an actuated condition.
Figure 7:
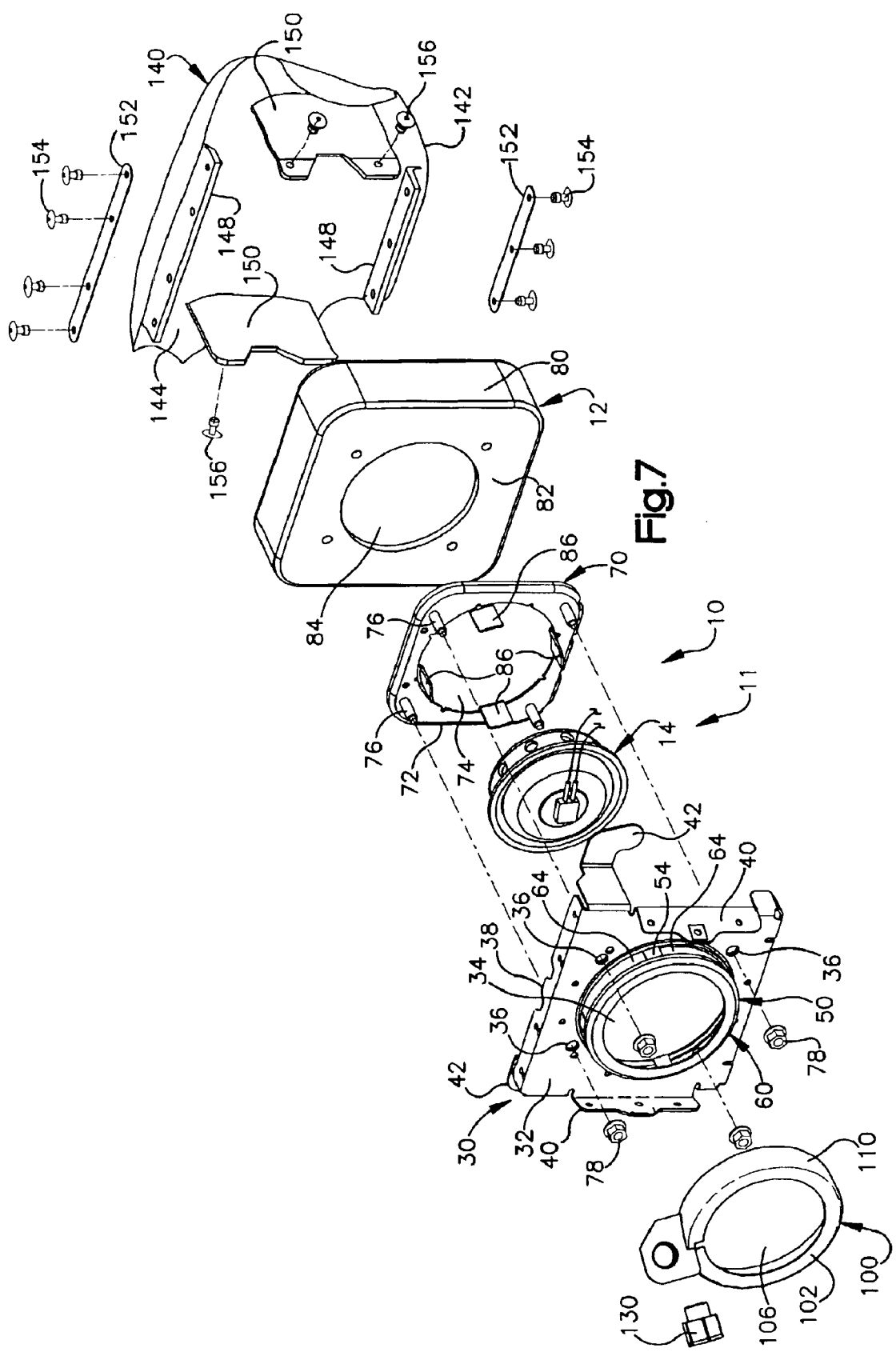
FIG. 7 is an exploded perspective view of the apparatus of FIG. 1.

The vent cover 100 of the first embodiment is formed as a split ring having a planar, ring-shaped bottom wall 102. The bottom wall 102 has an inner peripheral portion 104 that defines a circular central opening 106 in the bottom wall. The bottom wall also has an outer peripheral portion 108 (FIG. 4).

A cylindrical side wall 110 of the vent cover 100 extends upward from the outer peripheral portion 108 of the bottom wall 102. The side wall 110 has an inner diameter approximately equal to the outer diameter of the vent wall 60 of the reaction plate 30.

The side wall 110 of the vent cover 100 has first and second end portions 112 and 114. A first radially extending mounting flange 116 is disposed on the first end portion 112 of the side wall 110 and has a fastener opening 118. A second radially extending mounting flange 120 is disposed on the second end portion 114 of the side wall 110 and has a fastener opening 122. A nut 124 is welded or otherwise attached on the second radially extending mounting flange 120 at the fastener opening 122.

The first and second mounting flanges 116 and 120 extend parallel to each other and overlie each other when the vent cover 100 is in the closed condition shown in FIGS. 1–5. The fastener opening 122 in the second mounting flange 120 overlies the fastener opening 118 in the first mounting flange 116.

When the vent cover 100 is assembled with the inflator 14 and the reaction plate 30, the main body portion 18 of the inflator extends through the central opening 106 in the bottom wall 102 of the vent cover. The side wall 110 of the vent cover 100 overlies the vent wall 60 of the reaction plate 30, and covers the slots 64 of the vent opening 62 in the reaction plate.

The dimensions of the vent cover 100 are selected so that the vent cover is securely clamped on the vent wall 60 of the reaction plate 30 when the first and second mounting flanges 116 and 120 are brought together. An actuatable fastener 130, in the form of an explosive bolt, extends through the fastener openings 118 and 122 in the mounting flanges 116 and 120, respectively, and is screwed into the weld nut 124. The fastener 130 clamps together the first and second mounting flanges 116 and 120. As a result, the vent cover 100 is clamped on the vent wall 60 of the reaction plate 30. The side wall 110 of the vent cover 100 blocks fluid flow through the slots 64 of the vent opening 62.

In the illustrated embodiments, the actuatable fastener 130 is an explosive bolt that is electrically actuatable by an electric current over lead wires 132. The actuatable fastener 130 may take different forms. The actuatable fastener 130 may alternatively be an explosive rivet, for example.

The inflator 14, the air bag 12, and the retainer 70 are, in the illustrated embodiments, enclosed in a cover 140. The cover 140 is preferably made from plastic and includes a side wall 142 and a top wall 144. The top wall 144 has a predetermined weakened portion or tear seam 146 (FIG. 1).

The cover 140 has two mounting flanges 148 that extend from the side wall 142 and two mounting flanges 150 that extend from the top wall 144. Cover retainers 152 and rivets 154 secure the mounting flanges 148 to the reaction plate flanges 38. Additional rivets 156 secure the mounting flanges 150 of the cover 140 to the reaction plate flanges 40. (The cover 140 could be mounted or attached through other means.) When the cover 140 is thus mounted on the reaction plate 30, the top wall 144 and side wall 142 of the cover, together with the reaction plate 30 and the inflator 14, define a chamber 158 (FIG. 1) in the apparatus 10. The inflation fluid outlets 24 of the inflator 14 are located in the chamber 158.

Figure 2:
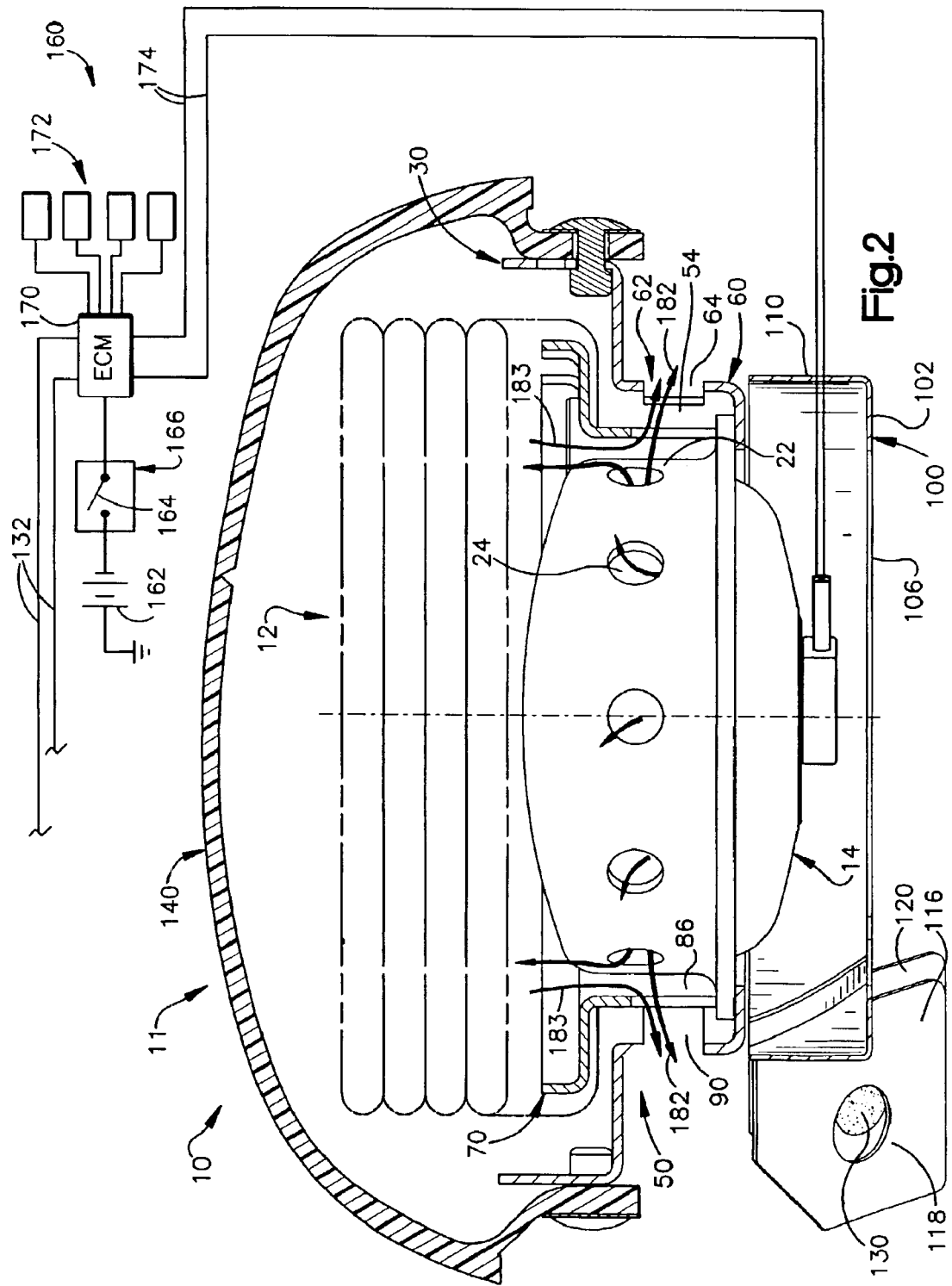
FIG. 2 is an illustration similar to FIG. 1 showing the vent cover in an open condition.
Figure 3:
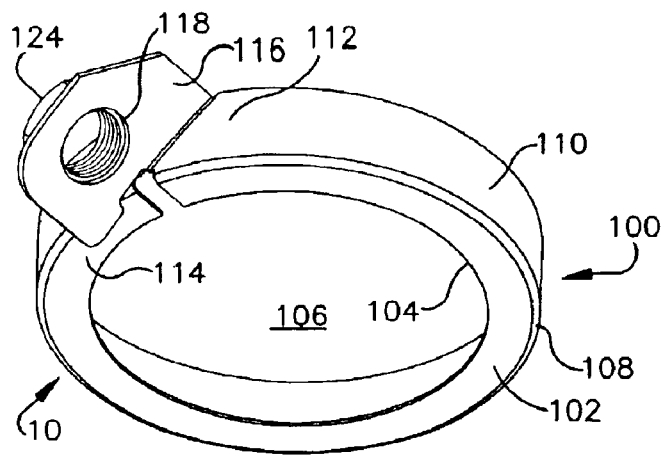
FIG. 3 is a perspective view of the vent cover of FIG. 1.

The apparatus 10 includes vehicle electric circuitry indicated schematically at 160 (FIG. 2). The vehicle electric circuitry 160 controls the operation of the inflator 14 and the actuatable fastener 130. The vehicle electric circuitry 160 includes a power source 162, which is preferably the vehicle battery and/or a capacitor, and a normally open switch 164. The switch 164 is part of a collision sensor 166, which senses a condition indicating the occurrence of a vehicle collision. The collision-indicating condition may comprise, for example, sudden vehicle deceleration caused by a collision. The vehicle electric circuitry 160 further includes a controller, or control module, 170 for controlling the operation of the vehicle electric circuitry, and a sensor assembly 172.

The sensor assembly 172 includes one or more sensors that generate one or more control signals useful in determining whether to inflate the air bag 12 with maximum speed and force when a vehicle collision is sensed. For example, the sensor assembly 172 may include an occupant position sensor that generates a control signal indicative of the position of a vehicle occupant in the interior of a vehicle. The sensor assembly 172 may also include a buckle switch for generating a control signal indicative of a buckled or unbuckled condition of a seat buckle assembly of the vehicle. The sensor assembly 172 may also include a sensor that senses the presence of a rearward-facing child seat, a weight sensor, a belt tension sensor, an occupant size sensor, a module temperature sensor, or a crash severity sensor.

If a collision-indicating condition sensed by the collision sensor 166 is above a predetermined threshold, it indicates the occurrence of a collision for which inflation of the air bag 12 is desired to help protect the occupant of the vehicle. The switch 164 in the collision sensor 166 closes and the control module 170 transmits an actuation signal to the inflator 14 over lead wires 174. When the inflator 14 is actuated, it emits a large volume of inflation fluid from the inflation fluid outlets 24, into the plenum chamber 90.

The inflation fluid flows from the plenum chamber 90, through the retainer 70, and into the mouth portion 82 of the air bag 12. The inflation fluid begins to inflate the air bag 12, which moves rapidly and forcefully outward against the top wall 144 of the cover 140. The cover 140 opens and the air bag 12 inflates into a position to help protect the vehicle occupant.

Upon such an occurrence of a condition requiring actuation of the inflator 14, the control module 170 receives the control signals from the sensor assembly 172. The control module 170 determines, on the basis of those signals, whether it is desirable to actuate the fastener 130. This determination, as well as the actuating of the fastener 130 itself, can be made prior to actuation of the inflator 14, or at the same time as actuation of the inflator, or after actuation of the inflator.

The control signals from the sensor assembly 172 may indicate a condition in which it is desirable that the air bag 12 be inflated with maximum force and speed. If the control module 170 receives signals indicating such a condition, the control module determines that the actuatable fastener 130 should remain in the unactuated condition. The fastener 130 is not energized by the control module 170, and maintains the flanges 116 and 120 of the vent cover 100 clamped against each other. The vent cover 100 remains clamped on the vent portion 50 of the reaction plate 30, covering the slots 64 of the vent opening 62. As a result, all the inflation fluid from the inflator 14 is directed from the plenum chamber 90 into the inflation fluid opening 84 of the air bag 12, as indicated by the arrows 180 (FIG. 1), and the air bag inflates with maximum speed and force.

On the other hand, one or more of the control signals from the sensor mechanism 172 may indicate a condition in which it is desirable not to inflate the air bag 12 with maximum speed and force. If the control module 170 receives a signal indicative of such a condition, the control module determines that the fastener 130 should be actuated. A control signal is transmitted from the control module 170, through the lead wires 132, to the fastener 130. The fastener 130 is electrically energized and moves from the unactuated position shown in FIG. 1 to a second, or actuated, position shown in FIG. 2.

The fastener 130, which in the illustrated embodiments is an explosive bolt, fractures. As a result, the fastener 130 no longer secures the first mounting flange 116 of the vent cover 100 to the second mounting flange 120 of the vent cover. The vent cover 100 is free to spring apart circumferentially and move away from the vent portion 60 of the reaction plate 30, under the influence of the explosive force of the bolt 130 and of gravity.

The vent cover 100 moves from the installed or closed condition shown in FIG. 1 to an open condition off the vent wall 60 of the reaction plate 30, as shown in FIG. 2. The movement of the vent cover 100 enables at least some inflation fluid to be vented through the slots 64 of the vent opening 62, as indicated by the arrows 182 (FIG. 2). The vent cover 100 may come to rest on the steering wheel hub (not shown).

The inflation fluid that flows out of the chamber 90 through the vent opening 62 does not flow into the air bag 12 to inflate the air bag. In addition, some inflation fluid flows out of the air bag 12 through the vent opening 62, as indicated by the arrows 183. As a result, the amount of inflation fluid flowing into the air bag 12, or the pressure of the inflation fluid, is reduced as compared to the amount or pressure of inflation fluid flowing into the air bag when the fastener 130 remains unactuated. This change in the flow of inflation fluid can help to reduce or control the pressure, speed and force of deployment of the air bag 12.

A second embodiment of the present invention is illustrated in FIGS. 8–11. The second embodiment of the invention is similar to the first embodiment of the invention illustrated in FIGS. 1–7. Accordingly, numerals similar to those of FIGS. 1–7 will be utilized in FIGS. 8–11 to identify similar components, the suffix letter "a" being associated with the numerals of FIGS. 8–11 to avoid confusion. The second embodiment of the present invention is similar to the first embodiment (FIGS. 1–7), except that the vent cover of the second embodiment has a two-piece construction instead of a one-piece construction.

Referring to FIGS. 8–11, the vent cover 10a of the second embodiment has a two-piece construction that, when assembled, forms a split ring configuration similar to that of the first embodiment illustrated in FIGS. 1–7. The vent cover 100a is thus suitable for use with the air bag module of the first embodiment (see FIGS. 1, 2, and 7). In the two-piece construction of the second embodiment, the vent cover 100a includes a first cover piece 200 and a second cover piece 220, each of which has a generally arc-shaped or semi-circular configuration.

The first cover piece 200 has a first end portion 202 and an opposite second end portion 204. The first end portion 202 of the first cover piece 200 includes a first mounting flange 116a with a fastener opening 118a. The second cover piece 220 has a first end portion 222 and an opposite second end portion 224. The first end portion 222 of the second cover piece 220 includes a second mounting flange 120a with a fastener opening 122a. A nut 124a is welded or otherwise attached on the second radially extending mounting flange 120a at the fastener opening 122a.

The second end portion 204 of the first cover piece 200 comprises a latch member 206. As shown more clearly in FIGS. 10 and 11, the latch member 206 includes a relatively narrow strip portion 208 and a wider end portion 210. The end portion 210 has a semi-circular configuration and forms a terminal end of the first cover piece 200. The end portion 210 has an arc-shaped leading edge 212 and a pair of latching edges 214 that project inward from opposite ends of the leading edge toward the strip portion 208 and intersect with the strip portion. The second end portion 224 of the second cover piece 220 comprises a latch receiver 226. The latch receiver 226 comprises a pair of hook members 228 that have a generally U-shaped configuration and that extend from a terminal edge 230 of the second end portion 224 (see FIGS. 9–11).

Figure 10:
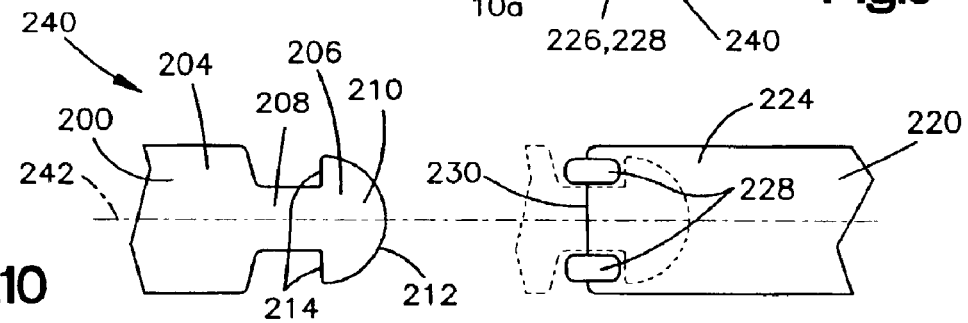
FIG. 10 is a magnified view of a portion of the vent cover of FIG. 8 illustrating the vent cover in a disassembled condition.
Figure 11:
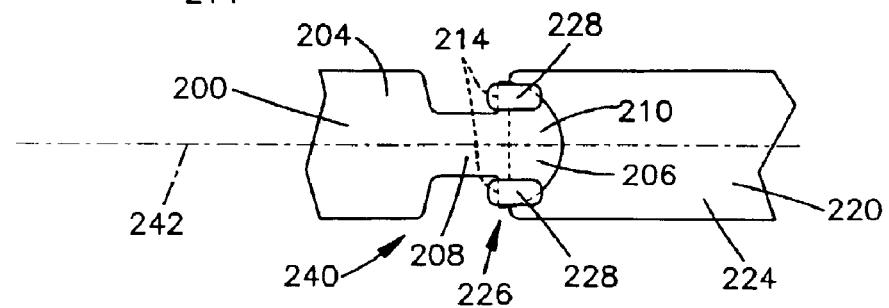
FIG. 11 is a magnified view of a portion of the vent cover of FIG. 8 illustrating the vent cover in an assembled condition.

The latch member 206 of the first cover piece 200 and the latch receiver 226 of the second cover piece 220 form a latch mechanism 240 of the vent cover 10a. The latch mechanism 240 functions to connect the second end portion 206 of the first cover piece 200 with the second end portion 226 of the second cover piece 220. As shown in FIG. 10, the first and second cover pieces 200 and 220 are aligned with each other such that the latch member 206 and latch receiver 226 are positioned along an axis 242. The first cover piece 200 is moved along the axis 242 to a position such that the latching edges 214 of the end portion 210 are positioned beyond (i.e., to the right as viewed in FIG. 10) the hook members 228 of the second cover piece 220. This is shown in dashed lines in FIG. 10. Once the end portion 210 is in this position, the latching edges 214 are guided into the U-shaped hook members 228 and the latch member 206 is received in the latch receiving member 226. This is shown in FIG. 11. The latch mechanism 240 thus interconnects the second end portion 204 with the second end portion 224 to place the first and second cover pieces 200 and 220 in the assembled condition of FIGS. 8, 9, and 11.

Figure 8:
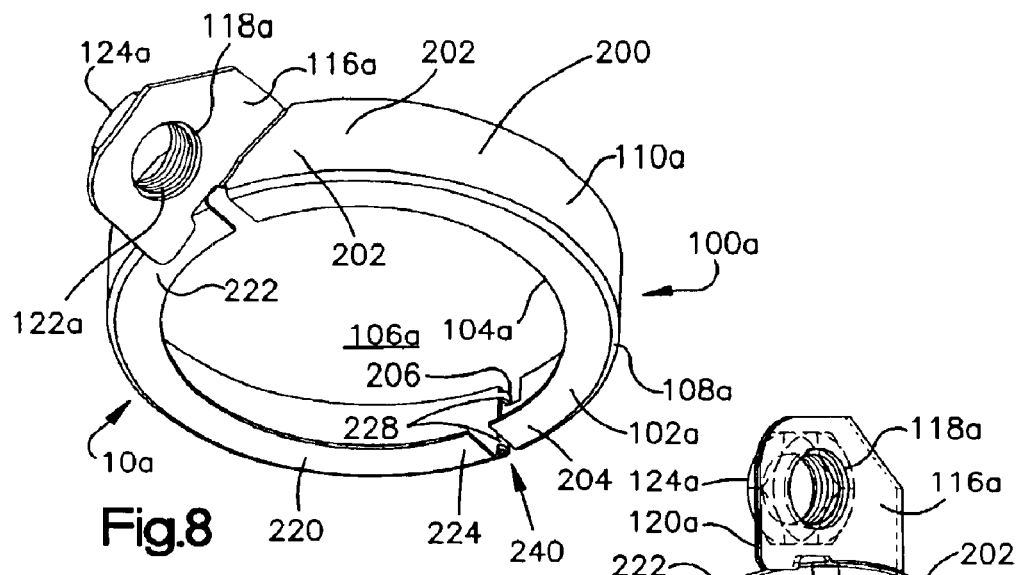
FIG. 8 is a perspective view of a vent cover in accordance with a second embodiment of the present invention.
Figure 9:
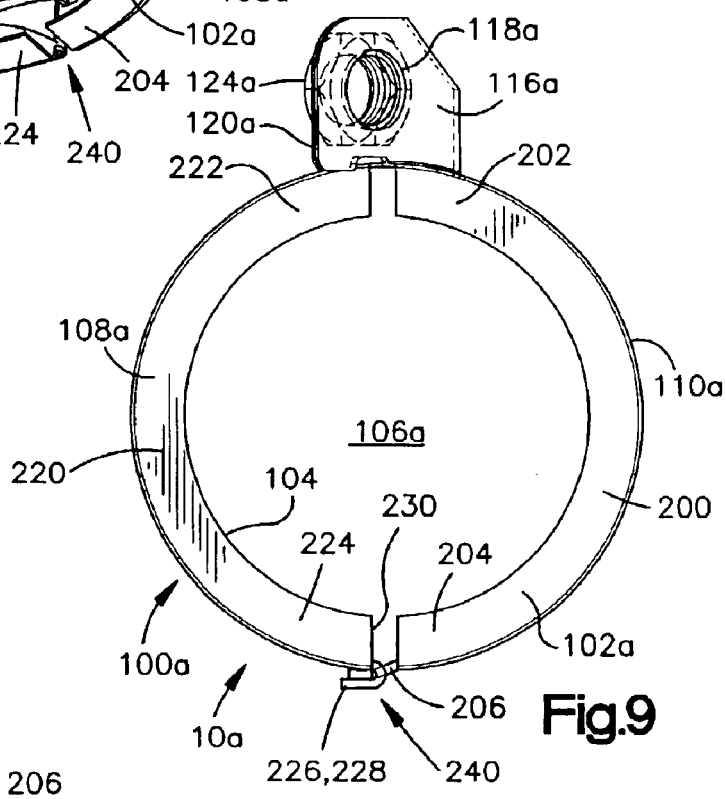
FIG. 9 is a bottom plan view of the vent cover of FIG. 8.

Referring to FIGS. 8 and 9, when the first and second pieces 200 and 220 are in the assembled condition, the vent cover 100a assumes the general configuration of the vent cover of the first embodiment (see FIGS. 1–7). The vent cover 100a thus has a planar, ring-shaped bottom wall 102a with an inner peripheral portion that defines a circular central opening 106a in the bottom wall. The bottom wall also has an outer peripheral portion 108a. A cylindrical side wall 110a of the vent cover 100a extends upward from the outer peripheral portion 108a of the bottom wall 102a.

The assembled vent cover 100a of the second embodiment is suited for connection with an air bag module in a manner similar to that described with respect to the first embodiment of FIGS. 1–7. The vent cover 100a thus blocks fluid flow through vent openings (not shown in FIGS. 8–11) of the inflator. The vent cover 100a is releasable, via actuation of an actuatable fastener, to permit fluid flow through the vent openings in a manner similar to that described above with regard to the first embodiment. By "in a manner similar to", it is meant that the vent cover 10a of the second embodiment functions in a manner identical to the vent cover 100 (FIGS. 1–7) of the first embodiment, with the exception, perhaps, of small differences brought about as a result of the two-piece construction of the second embodiment as opposed to the one-piece construction of the first embodiment.

Figure 12:
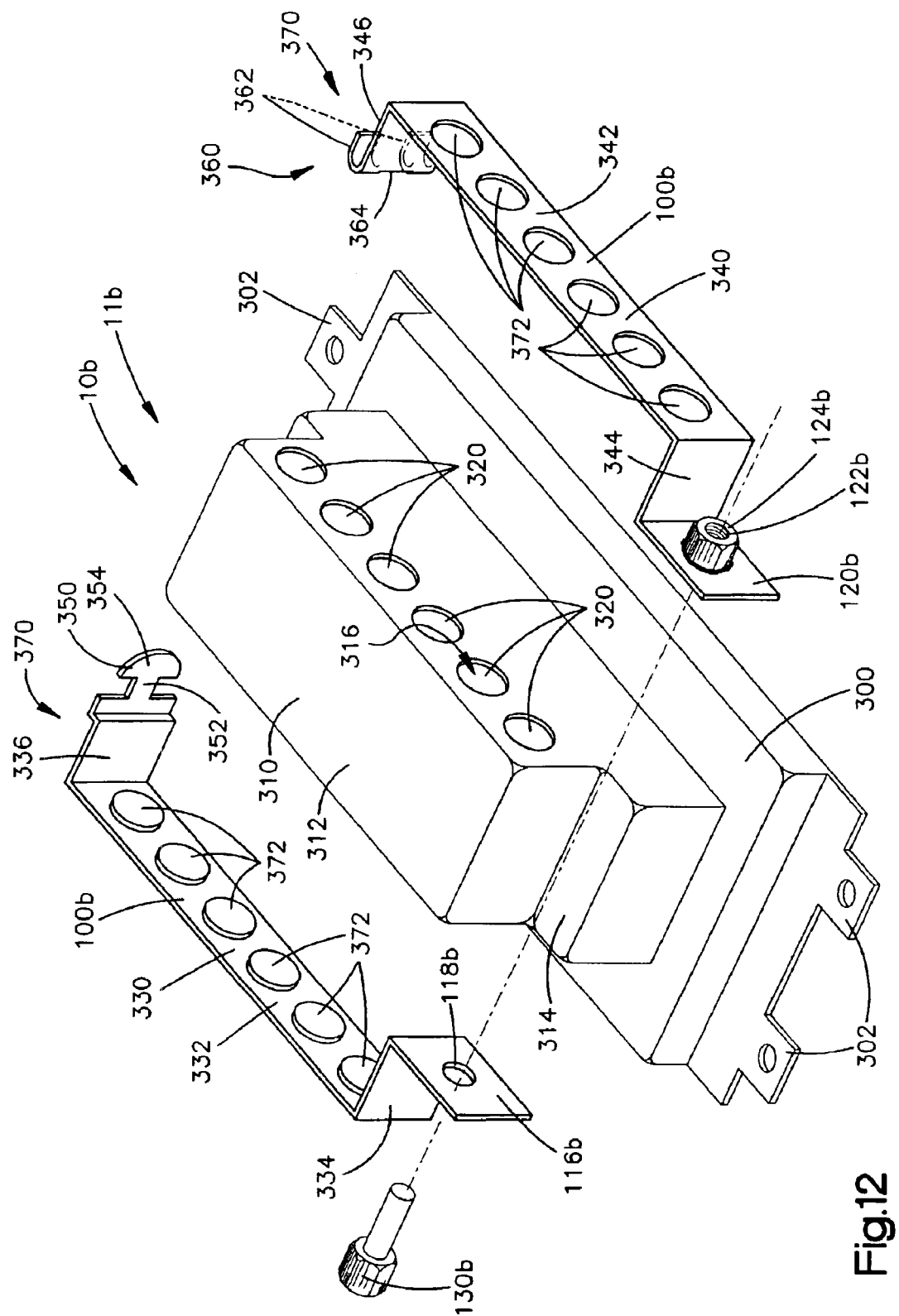
FIG. 12 is a perspective view of a vehicle occupant protection apparatus constructed in accordance with a third embodiment of the present invention, including a vent cover shown in a disassembled condition.
Figure 13:
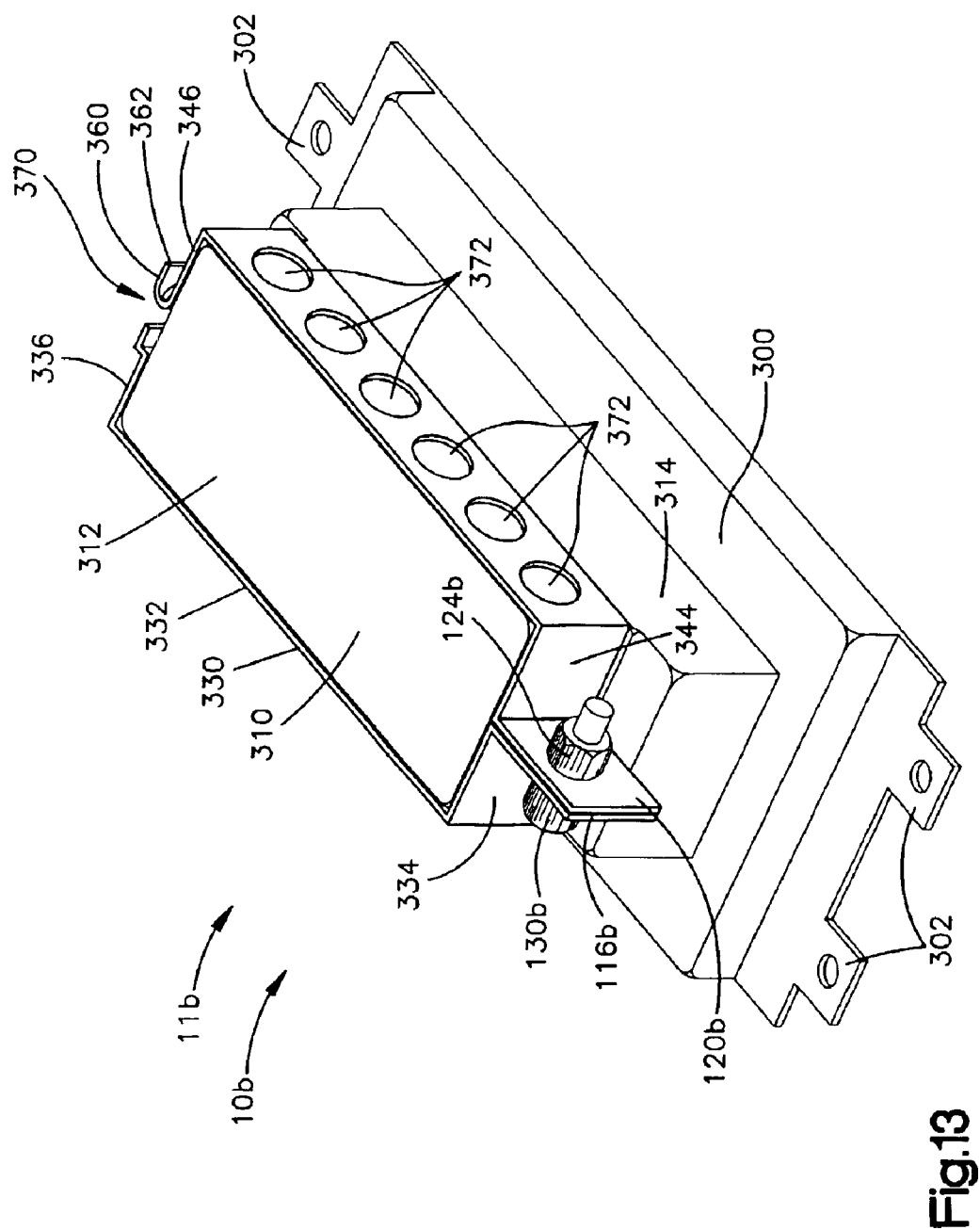
FIG. 13 is a perspective view of the vehicle occupant protection apparatus of FIG. 12 illustrating the vent cover in an assembled condition.

A third embodiment of the present invention is illustrated in FIGS. 12 and 13. The third embodiment of the invention is similar to the first and second embodiments of the invention illustrated in FIGS. 1–11. Accordingly, numerals similar to those of FIGS. 1–11 will be utilized in FIGS. 12 and 13 to identify similar components, the suffix letter "b" being associated with the numerals of FIGS. 12 and 13 to avoid confusion. The third embodiment of the present invention is similar to the first and second embodiments (FIGS. 1–11), except that the vent cover of the third embodiment has a rectangular configuration instead of a circular or ring-shaped configuration.

Referring to FIGS. 12 and 13, the apparatus 10b of the third embodiment includes an air bag module 11b having a generally rectangular configuration. The air bag module 11b is a passenger side air bag module mountable in the vehicle instrument panel or dash, whereas the module of the first and second embodiments (FIGS. 1–11) is a driver side air bag module mountable on a vehicle steering wheel. Those skilled in the art will appreciate that the air bag module 11b may also be suitable for alternative implementations, such as in an inflatable knee bolster or a side impact air bag.

The air bag module 11b includes a reaction plate 300 that supports a canister 310. In the embodiment of FIGS. 12 and 13, the reaction plate 300 and the canister 310 are formed as a single piece. The reaction plate 300 and the canister 310 could, however, have a multi-piece construction. The reaction plate 300 includes means, such as tabs 302, for securing the module 11b to the vehicle at a location such as the instrument panel (not shown). The canister 310 includes a first portion 312 and a second portion 314, each of which has a generally rectangular configuration. The first portion 312 is shorter in length and equal in width to the second portion 314. This gives the canister 310 the "stepped" appearance shown in FIGS. 12 and 13. The canister 310 of FIGS. 12 and 13 is for illustrative purposes, and it should be appreciated that the canister could have a variety of alternative configurations while maintaining its overall generally rectangular configuration.

The canister 310 forms a chamber 316 for receiving an air bag and an inflator (not shown) for inflating the air bag. The first portion 312 includes a plurality of vent holes 320 spaced along its length. The vent holes 320 are in fluid communication with the chamber 316 and vent inflation fluid from the chamber when the inflator is actuated.

The air bag module 11b of the third embodiment includes a vent cover 100b that has a rectangular configuration that mates with the outer dimensions of the first portion 312 of the canister 310 to cover the vent holes 320. As shown in FIGS. 12 and 13, the vent cover 100b has a two-piece construction similar to the second embodiment of the invention (see FIGS. 8–11). The vent cover 100b could, however, have a one piece construction similar to that of the first embodiment of the invention (see FIGS. 1–7).

The vent cover 100b includes a first cover piece 330 and a second cover piece 340. The first cover piece 330 has a longitudinally extending central portion 332 with a first end and an opposite second end. A first end portion 334 extends perpendicularly from the first end of the central portion 332. A second end portion 336 extends perpendicularly from the second end of the central portion 332. The first end portion 334 of the first cover piece 330 includes a first mounting flange 116b with a fastener opening 118b.

The second cover piece 340 has a longitudinally extending central portion 342 with a first end and an opposite second end. A first end portion 344 extends perpendicularly from the first end of the central portion 342. A second end portion 346 extends perpendicularly from the second end of the central portion 342. The first end portion 344 of the first cover piece 340 includes a second mounting flange 120b with a fastener opening 122b. A nut 124b is welded or otherwise attached on the second radially extending mounting flange 120b at the fastener opening 122b.

The second end portion 336 of the first cover piece 330 comprises a latch member 350. The latch member 350 has a configuration similar or identical to the latch member 206 of the second embodiment (see FIGS. 8–11). The latch member 350 (FIG. 12) includes a relatively narrow strip portion 352 and a wider end portion 354. The end portion 354 has a semi-circular configuration and forms a terminal end of the first cover piece 330. The end portion 354 has an arc-shaped leading edge and a pair of latching edges that project inward toward strip portion 352 and intersect with the strip portion.

The second end portion 346 of the second cover piece 340 comprises a latch receiver 360. The latch receiver 360 comprises a pair of hook members 362 having a generally U-shaped configuration that extend from a terminal edge 364 of the second end portion 346.

The latch member 350 of the first cover piece 330 and the latch receiver 360 of the second cover piece 340 form a latch mechanism 370 of the vent cover 100b. The latch mechanism 370 functions to connect the second end portion 336 of the first cover piece 330 with the second end portion 346 of the second cover piece 340. This connection is made in a manner similar to that illustrated in the second embodiment (see FIGS. 10 and 11). The latch mechanism 370 thus interconnects the second end portion 336 of the first cover piece 330 with the second end portion 346 of the second cover piece 340.

The assembled vent cover 100b of the second embodiment is thus suited for connection with the air bag module 11b in a manner similar to that described in the first and second embodiments of FIGS. 1–11. Referring to FIGS. 12 and 13, the vent cover 100b, in the assembled condition with the latch mechanism 370 interconnecting the second end portions 336 and 346, is placed around the first portion 312 of the canister 310. An actuatable fastener 130b extends through the aperture 118b in the flange 116b and through the aperture 122b in the flange 120b. The actuatable fastener 130b cooperates with the weld nut 124b to connect the flanges 116b and 120b and thus secure the vent cover 100b to the canister 310.

The vent cover 100b, when connected to the canister 310, extends around a periphery of the first portion 312. As best shown in FIG. 12, the vent cover 100b may include cylindrical projections 372 spaced along the central portions 332 and 342 of the first and second cover portions 330 and 340, respectively. The projections are spaced to coincide with the vent openings 320. When the vent cover 100b is connected to the canister 310, the projections 372 extend into the vent openings 320 in the canister 310 and thus close or block the vent openings.

The vent cover 100b thus blocks fluid flow through vent openings 320 in the canister. The vent cover 100b is releasable, via actuation of the actuatable fastener 130b, to release the vent cover from the canister 310 to permit fluid flow through the vent openings in a manner similar to that described above with regard to the second embodiment. By "in a manner similar to", it is meant that the vent cover 100b of the third embodiment functions in a manner identical to the vent cover 100a (FIGS. 8–11) of the second embodiment, with the exception, perhaps, of small differences brought about as a result of the rectangular configuration of the third embodiment as opposed to the circular or ring-shaped configuration of the second embodiment.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant protection apparatus comprising:
   an inflatable vehicle occupant protection device for, when inflated, helping to protect the vehicle occupant;
   an inflator for providing inflation fluid for inflating said protection device, said inflator having a plurality of inflation fluid outlets;
   a vent member connected with said inflator and having a vent wall having at least one vent opening;
   a vent cover having an outer wall, said outer wall having first and second end portions, said vent cover having a closed condition clamped on said vent wall and covering said vent opening, said vent cover having an open condition removed at least partially from said vent wall and enabling fluid flow through said vent opening to vent inflation fluid from said apparatus; and
   an actuatable device having an unactuated condition connecting said first and second end portions to maintain said vent cover in the closed condition on said vent wall, said actuatable device having an actuated condition releasing said first and second end portions to release said vent cover for movement from the closed condition to the open condition to enable fluid flow through said vent opening to vent inflation fluid from said apparatus.

2. Apparatus as recited in claim 1, wherein said vent cover further comprises a first mounting flange disposed on said first end portion of said outer wall and a second mounting flange disposed on said second end portion of said outer wall, said actuatable device when in said unactuated condition connecting said first and second mounting flanges to maintain said vent cover in the closed condition on said vent wall, said actuatable device when in said actuated condition releasing said first and second mounting flanges to release said vent cover for movement from the closed condition to the open condition to enable fluid flow through said vent opening to vent inflation fluid from said apparatus.

3. Apparatus as recited in claim 2, wherein said first and second mounting flanges extend parallel to each other and overlie each other when said vent cover is in the closed condition to clamp said vent cover on said vent wall, and wherein said actuatable device extends through said first and second mounting flanges.

4. Apparatus as recited in claim 1, wherein said actuatable device comprises an explosive bolt.

5. Apparatus as recited in claim 1, wherein said vent member has a cylindrical configuration, said outer wall of said vent cover having a cylindrical configuration that mates with said cylindrical vent member.

6. Apparatus as recited in claim 5, further comprising a retainer having an annular, radially extending main body portion for clamping said protection device to said vent member, said retainer having a plurality of axially extending, circumferentially spaced clamping legs for clamping said inflator to said vent member at a location radially between said inflation fluid outlets of said inflator and said vent opening;
   said circumferentially spaced clamping legs of said retainer defining between them a plurality of circumferentially spaced fluid passages that provide fluid communication between said inflation fluid outlets of said inflator and said vent opening in said vent member.

7. Apparatus as recited in claim 6, wherein said vent member comprises a reaction member for supporting said apparatus on the vehicle.

8. Apparatus as recited in claim 1, wherein said vent member has a rectangular configuration, said outer wall of said vent cover having a rectangular configuration that mates with said rectangular vent member.

9. Apparatus as recited in claim 1, wherein said vent cover comprises:
   a first cover portion having a first end and an opposite second end, said first end of said first cover portion comprising said first end portion of said vent cover; and
   a second cover portion having a first end and an opposite second end, said first end of said second cover portion comprising said second end portion of said vent cover;
   said second ends of said first and second cover portions being engageable with each other to connect said second ends of said first and second cover portions;

said first ends of said first and second cover portions being connectable to each other via said actuatable device.

10. Apparatus as recited in claim 9, wherein one of said second ends comprises a latch member and the other of said second ends comprises at least one hook member, said latch member being engageable with said hook member to connect said second ends of said first and second cover portions.

11. Apparatus as recited in claim 9, wherein said vent member has a cylindrical configuration, said first and second cover portions each having a semi-cylindrical configuration.

12. Apparatus as recited in claim 9, wherein said vent member has a rectangular configuration, said first and second cover portions each having a semi-rectangular semi-cylindrical configuration.

13. An apparatus as set forth in claim 1 wherein said vent member comprises a reaction member for supporting said apparatus on the vehicle.

14. An apparatus as set forth in claim 1 wherein said vent cover comprises a projection for extending into said vent opening to help block fluid flow through said vent opening when said vent cover is in said closed condition.

15. A vehicle occupant protection apparatus comprising:
an inflatable vehicle occupant protection device for, when inflated, helping to protect the vehicle occupant;
an inflator for providing inflation fluid for inflating said protection device, said inflator having a generally cylindrical configuration and having a plurality of inflation fluid outlets;
a vent member connected with said inflator and having an annular vent wall having at least one vent opening;
a vent cover formed as a split ring and having a cylindrical outer wall, said outer wall having first and second end portions, a first mounting flange being disposed on said first end portion of said outer wall, and a second mounting flange being disposed on said second end portion of said outer wall, said vent cover having a closed condition clamped on said vent wall and covering said vent opening, said vent cover having an open condition removed at least partially from said vent wall and enabling fluid flow through said vent opening to vent inflation fluid from said apparatus; and
an actuatable device having an unactuated condition connecting said first and second mounting flanges to maintain said vent cover in the closed condition on said vent wall, said actuatable device having an actuated condition releasing said first and second mounting flanges to release said vent cover for movement from the closed condition to the open condition to enable fluid flow through said vent opening to vent inflation fluid from said apparatus.

16. A vehicle occupant protection apparatus comprising:
an inflatable vehicle occupant protection device for, when inflated, helping to protect the vehicle occupant;
an inflator for providing inflation fluid for inflating said protection device, said inflator having a plurality of inflation fluid outlets;
a vent member connected with said inflator and having a rectangular vent wall having at least one vent opening;
a vent cover having a rectangular outer wall, said outer wall having first and second end portions, a first mounting flange being disposed on said first end portion of said outer wall, and a second mounting flange being disposed on said second end portion of said outer wall, said vent cover having a closed condition clamped on said vent wall and covering said vent opening, said vent cover having an open condition removed at least partially from said vent wall and enabling fluid flow through said vent opening to vent inflation fluid from said apparatus; and
an actuatable device having an unactuated condition connecting said first and second mounting flanges to maintain said vent cover in the closed condition on said vent wall, said actuatable device having an actuated condition releasing said first and second mounting flanges to release said vent cover for movement from the closed condition to the open condition to enable fluid flow through said vent opening to vent inflation fluid from said apparatus.

17. A vehicle occupant protection apparatus comprising:
an inflatable vehicle occupant protection device for, when inflated, helping to protect the vehicle occupant;
an inflator for providing inflation fluid for inflating said protection device, said inflator having a plurality of inflation fluid outlets;
a vent member connected with said inflator and having a vent wall having at least one vent opening;
a vent cover comprising a first cover portion and a second cover portion, said first cover portion having a first end comprising a first flange portion and an opposite second end comprising a latch member, said second cover portion having a first end comprising a second flange portion and an opposite second end comprising a hook, said latch member of said first cover portion being engageable with said hook of said second cover portion to connect said second ends of said first and second cover portions; and
an actuatable device having an unactuated condition connecting said first and second flange portions to maintain said vent cover in a closed condition clamped onto said vent wall and blocking inflation fluid flow through said vent opening, said actuatable device having an actuated condition releasing said first and second flange portions to release said vent cover for movement from the closed condition to an open condition at least partially spaced from said vent wall to enable fluid flow through said vent opening to vent inflation fluid from said apparatus.

18. A vehicle occupant protection apparatus comprising:
an inflatable vehicle occupant protection device for, when inflated, helping to protect the vehicle occupant;
an inflator for providing inflation fluid for inflating said protection device, said inflator having a generally cylindrical configuration centered on an axis and having a plurality of inflation fluid outlets for directing inflation fluid to flow radially outward from said inflator;
a reaction plate for supporting said inflator and said protection device on the vehicle, said reaction plate having at least one vent opening disposed radially outward of said inflation fluid outlets of said inflator;
a retainer having an annular, radially extending main body portion for clamping said protection device to said reaction plate and having a plurality of axially extending, circumferentially spaced clamping legs for clamping said inflator to said reaction plate at a location radially between said inflation fluid outlets of said inflator and said vent opening of said reaction plate;
said circumferentially spaced clamping legs of said retainer defining between them a plurality of circumferentially spaced fluid passages that provide fluid communication between said inflation fluid outlets of said inflator and said vent opening in said reaction plate;

a vent cover having a closed condition clamped on said reaction plate and covering said vent opening; and an actuatable device on said vent cover, said actuatable device having an unactuated condition maintaining said vent cover in the closed condition clamped on said reaction plate, said actuatable device having an actuated condition releasing said vent cover for movement from the closed condition to an open condition removed at least partially from said reaction plate and enabling fluid flow through said vent opening to vent inflation fluid from said apparatus.

19. An apparatus as set forth in claim 18 wherein said reaction plate has a cylindrical vent wall in which said vent opening is formed, said vent cover having a cylindrical portion covering said vent opening in said cylindrical vent wall.

20. An apparatus as set forth in claim 19 wherein said cylindrical vent wall depends from a planar central portion of said reaction plate.

* * * * *